Oct. 9, 1928.

E. E. HILLS 1,687,367

WINDSHIELD FOR VEHICLES

Filed Nov. 29, 1926

INVENTOR.
Ernest E. Hills,
BY
Morsell, Kemey & Morsell
ATTORNEYS.

Patented Oct. 9, 1928.

1,687,367

UNITED STATES PATENT OFFICE.

ERNEST E. HILLS, OF OSHKOSH, WISCONSIN.

WINDSHIELD FOR VEHICLES.

Application filed November 29, 1926. Serial No. 151,561.

This invention relates to improvements in windshields for vehicles.

It is the primary object of the present invention to provide a windshield which will prevent the collection of frost, snow or vapor thereon, so that the vision of the vehicle driver will not be hindered.

A further object of the invention is to provide a double glass windshield adapted for automobiles and busses, in which a heated compartment is formed between the two glass members preventing the formation on the glass of any matter which will hinder the vision of the driver.

A further object of the invention is to provide a windshield in which a clear vision through any portion thereof is at all times assured.

A further object of the invention is to provide a vehicle windshield which is of very simple construction, is strong and durable, is inexpensive to install, is attractive in appearance, and is well adapted for the purpose described.

With the above and other objects in view, the invention consists of the improved windshield and its parts and combinations as set forth in the claims, and all equivalents thereof.

In the accompanying drawing, in which the same reference characters indicate the same parts in all of the views.

Figure 1:
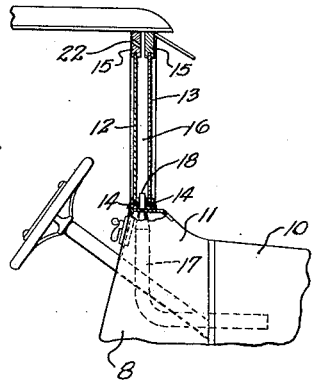
Fig. 1 is a fragmentary side view of an automobile equipped with the improved windshield, parts being broken away and shown in section.
Figure 2:
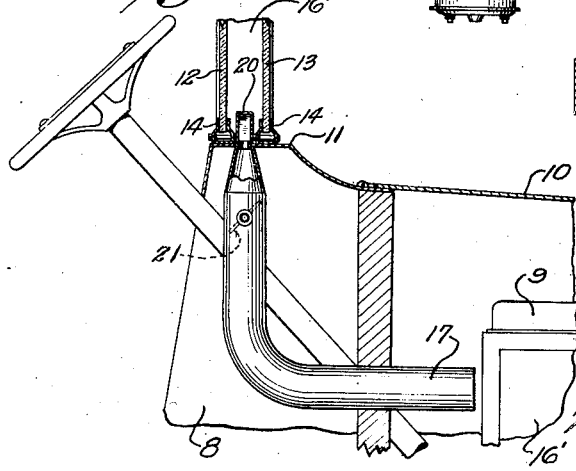
Fig. 2 is an enlarged fragmentary vertical sectional view of a portion of a vehicle and the improved windshield.
Figure 3:
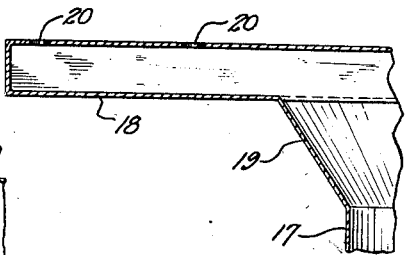
Fig. 3 is a longitudinal sectional view of the heat duct shown in Fig. 2, and on a larger scale.

Referring now more particularly to the drawings, and the form of the invention illustrated in Figs. 1, 2 and 3, it will appear that the numeral 8 designates the forward portion of a motor vehicle, and 9 the engine thereof enclosed by a hood 10.

Mounted above the cowl portion 11 are a pair of vertically extending panes of glass 12 and 13 which are mounted at their upper and lower portions in suitable supports or frames 14 and 15. The panes of glass are spaced apart, preferably a distance of about one-half of an inch, and plates or strips 16, positioned at each end of the panes, form with the same an enclosure or compartment. The forward windshield 13 is fixed, while the rear windshield 12 is removable, being adapted for use only in winter and to be removed in warm weather.

The exhaust manifold of the engine 9 may be covered by a hood 16', open at its inner end, and for the collection of warm air from the exhaust. Adjacent the open inner end of the hood 16' is the open end portion of an angular pipe 17 adapted to convey warm air to an elongated heater 18, the pipe 17 being widened at its junction with the heater, as indicated at 19, in Fig. 3.

The heater 18 is disposed longitudinally along the bottom portion of the compartment formed between the windshields and the end strips 16, and the upper portion of the heater is provided with a plurality of discharge apertures or vents 20 by which means the heated air is discharged into the compartment. Within the pipe 17 a manually operable damper 21 is provided to control the admission of heated air to the heater 18.

It will be evident that the heated air conducted to the compartment will prevent the formation of snow, frost and the like on either of the panes 12 and 13, and insure a clear vision therethrough. Discharge ducts 22 are formed in one of the glass supporting frames, as shown in Fig. 1, to permit the escape of air from the compartment.

Figure 4:
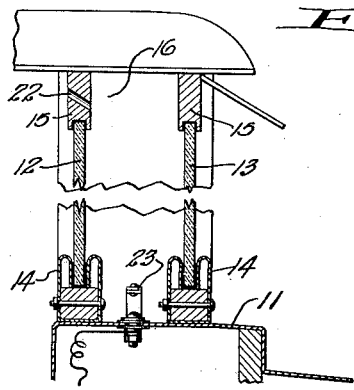
Fig. 4 is a fragmentary sectional view of a vehicle showing a windshield and an alternative arrangement for heating the same, especially adapted for busses.
Figure 5:
Fig. 5 is a view showing the electric heater and the wiring arrangement for the form of the invention shown in Fig. 4.

In Figs. 4 and 5, a type of windshield especially adapted for motor busses is shown. The spaced-apart windshield panes 12 and 13 are mounted in frames 14 and 15 and the ends are closed by strips 16, forming a compartment. The compartment between the windshields is, however, electrically heated. For this purpose, a plurality of electric heating units 23 are employed, said units being positioned along the bottom portion of the compartment. Said heating units are connected by means of circuit wires (see Fig. 5) with a storage battery 24, and a five point snap switch 25 is included in the circuits for controlling the degree of heat.

Figure 6:
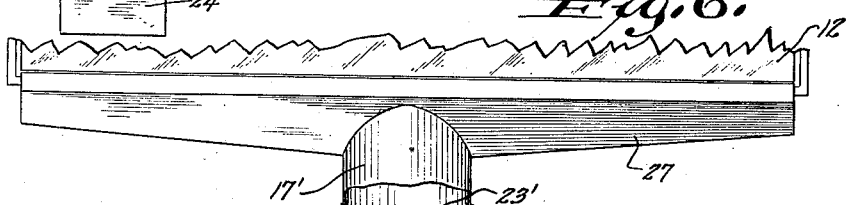
Fig. 6 is a fragmentary view, partly in section, of a second modification of the invention.

A second modification is illustrated in Fig. 6 wherein an electric heating unit 23' is mounted in a pipe portion 17' and below the heating unit is an electric fan 26. The pipe 17' opens into a header 27 which in turn discharges heated air between a pair of spaced apart windshields. The electric fan and heating unit are supplied with current from a storage battery, as in Fig. 5, and both may be so connected to permit either being put into the circuit independently of the other.

From the foregoing description, it will be seen that the improved windshield is of very simple and novel construction, and is well adapted for the purpose set forth.

What I claim as my invention is:

1. The combination with a vehicle, of a windshield, comprising a pair of glazed members interposed between portions of the vehicle and enclosed at their edge portions to form a compartment, one of said glazed members being fixed and the other being removable, an elongated hollow heat discharging member extending longitudinally along the bottom portion of the compartment, one wall of said member being provided with a plurality of discharge apertures, and means for conducting heated air to said heat discharging member.

2. The combination with a vehicle, of a windshield, comprising a pair of glazed members interposed between portions of the vehicle and enclosed at their edge portions to form a compartment, a heat discharging member within the lower portion of said compartment, a heat conducting member opening into said heat discharging member, an electric heating element within said conducting member, and a fan within said conducting member adjacent the heating element.

In testimony whereof, I affix my signature.

ERNEST E. HILLS.